United States Patent [19]

Kokura et al.

[11] Patent Number: 5,218,549
[45] Date of Patent: Jun. 8, 1993

[54] AXIS CONTROL SYSTEM FOR NUMERICAL CONTROL APPARATUS

[75] Inventors: Masuo Kokura, Hino; Kenichi Ito, Minamitsuru, both of Japan

[73] Assignee: Fanuc Ltd, Minamitsuru, Japan

[21] Appl. No.: 646,723

[22] PCT Filed: May 30, 1990

[86] PCT No.: PCT/JP90/00711
§ 371 Date: Jan. 29, 1991
§ 102(e) Date: Jan. 29, 1991

[87] PCT Pub. No.: WO90/16022
PCT Pub. Date: Dec. 27, 1990

[30] Foreign Application Priority Data

Jun. 20, 1989 [JP] Japan .................................. 1-157281

[51] Int. Cl.⁵ .............................................. G05B 19/19
[52] U.S. Cl. .................................. 364/474.31; 318/573
[58] Field of Search ................... 364/131, 138, 474.11, 364/474.01, 474.28, 474.31; 318/569, 573

[56] References Cited

U.S. PATENT DOCUMENTS

| 4,262,336 | 4/1981 | Pritchard | 364/474.11 |
| 4,514,814 | 4/1985 | Evans | 364/138 |
| 4,587,607 | 5/1986 | Kurakake | 364/474.11 |
| 4,684,862 | 7/1987 | Röhrle | 318/568 |
| 4,882,670 | 11/1989 | Isobe et al. | 364/188 |

FOREIGN PATENT DOCUMENTS 0105203 5/1987 Japan.

Primary Examiner—Jerry Smith
Assistant Examiner—Paul Gordon
Attorney, Agent, or Firm—Staas & Halsey

[57] ABSTRACT

Disclosed is an axis control system for a numerical control apparatus having first and second microprocessors (11, 21) for interpolating axes that each have a different axis arrangement and first and second interpolation signal generation circuits (17, 27) provided with each of the microprocessors for generating an interpolation cycle signal. The second interpolation signal generation circuit (27) receives an output signal (DO) from the first microprocessor and the interpolation cycle signal (ITP1) from the first interpolation signal generation circuit. The second interpolation signal generation circuit (27) generates an interpolation cycle signal synchronized with the first interpolation signal generation circuit (17) based on a logic of the received signals. When the interpolation cycle signal is synchronized, the first and second microprocessors (11, 21) can interpolate axes that each have a different axis arrangement.

1 Claim, 4 Drawing Sheets

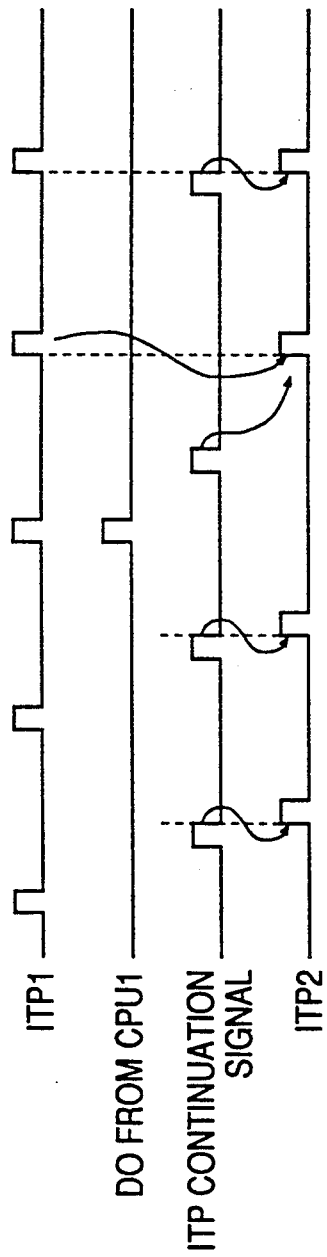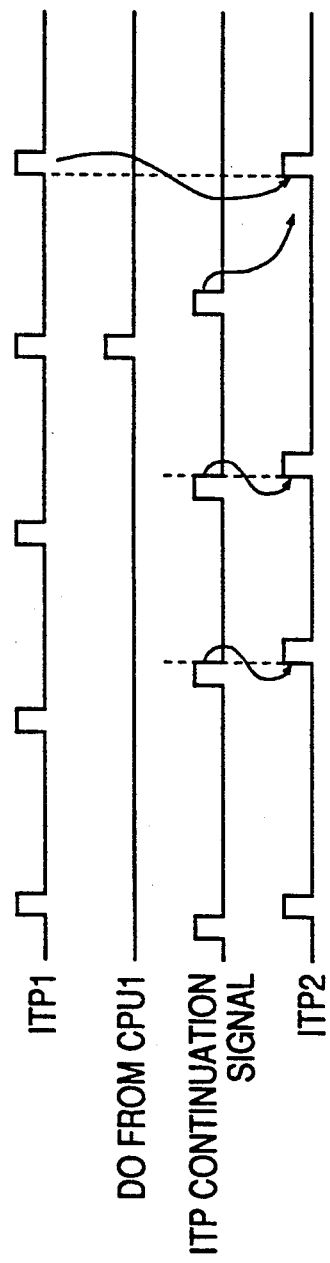

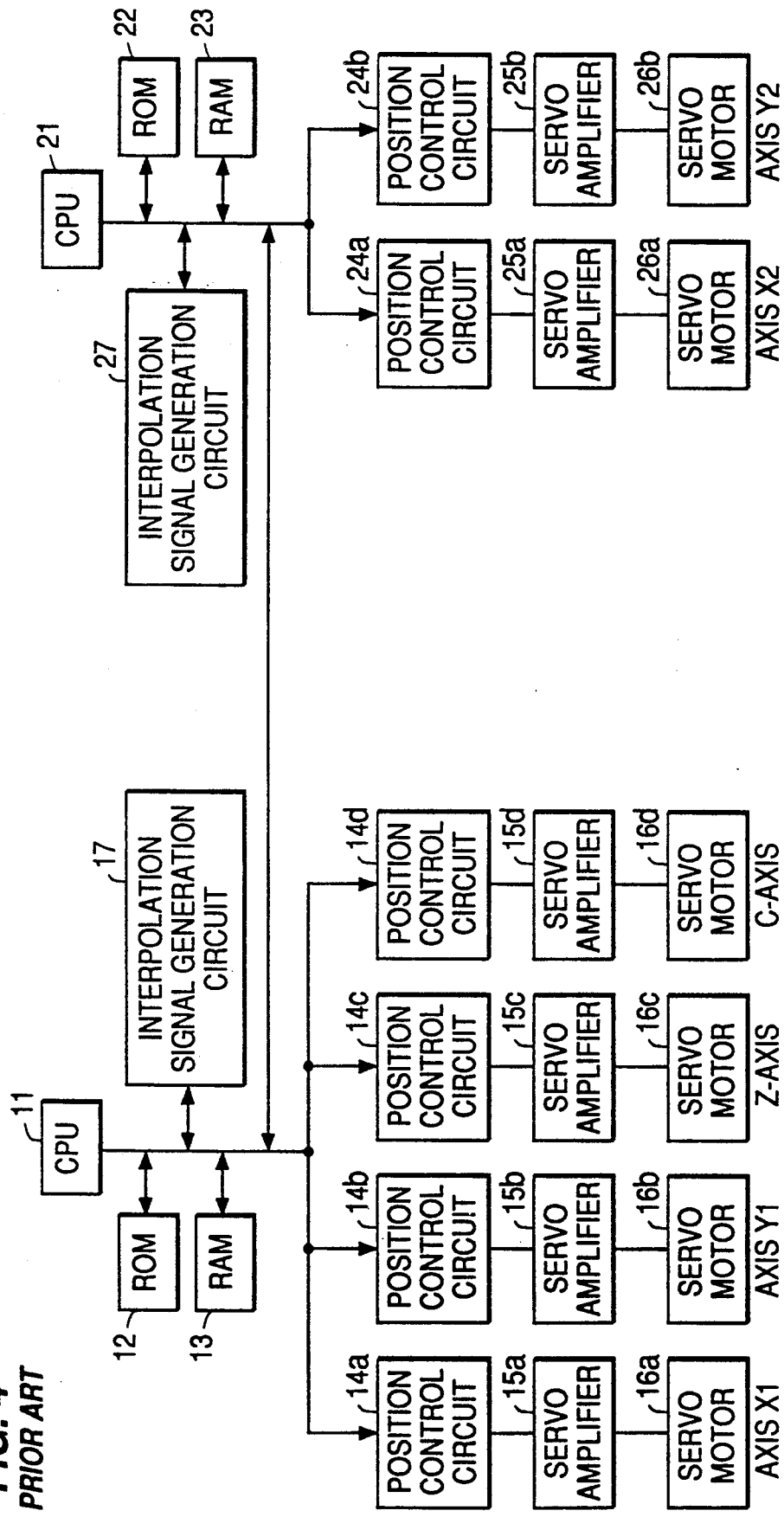
FIG. 4 *PRIOR ART*

AXIS CONTROL SYSTEM FOR NUMERICAL CONTROL APPARATUS

TECHNICAL FIELD

The present invention relates to an axis control system for a numerical control apparatus, and more specifically, to an axis control system for a numerical control apparatus by which a plurality of microprocessors (CPUs) interpolate axes that each have a different axis arrangement.

BACKGROUND ART

Numerical control apparatuses which control a multiplicity of axes or spindles are widely used to effect machining at a high speed. This type of the numerical control apparatus contains a plurality of microprocessors (CPUs), and the axes to be controlled are assigned to each CPU, respectively. More specifically, each CPU has an independent axis arrangement, and therefore, the axes to be controlled by each CPU are prefixed, and the axes which can be interpolated by each CPU are fixed by the axis arrangement thereof.

The prior art will be described below with reference to the drawings, wherein FIG. 4 shows a prior art axis control system for a numerical control apparatus.

A CPU 11 controls an axis arrangement composed of an axis X1 an axis Y1, a Z-axis, and a C-axis; a CPU 21 controls an axis arrangement composed of an axis X2 and an axis Y2; ROMs 12 and 22 are composed of an EPROM or an EEPROM and store the system program of the CPUs 11 and 21; and RAMs 13 and 23 are composed of a SRAM or the like and store various data or input/output signals. Although not shown, a nonvolatile memory supplied with power from a battery, a graphic control circuit, a display, an operator's panel and the like are connected to the CPUs 11 and 21, through a bus, in addition to the above-described units.

Each axis is composed of a position control circuit, a servo amplifier, and a servo motor, and since the respective axes have the same arrangement, only the axis X1 will be described here.

A position control circuit 14a receives a position command from the CPU 11 and outputs a speed command signal to a servo amplifier 15a for controlling a servo motor 16a. The servo amplifier 15a amplifies the speed command signal and drives the servo motor 16a.

Although not shown, a position sensor for outputting a position feedback signal and a tachometer generator for outputting a speed feedback signal are connected to the servo motor 16a, respectively. A pulse coder or the like is used as the position sensor to feed back a position feedback pulse to the position control circuit 14a. The tachometer generator feeds back a voltage signal in accordance with a rotational speed of the servo motor 16a to the servo amplifier 15a.

Interpolation signal generation circuits 17 and 27 count a system clock supplied thereto and output an ITP (interpolation) cycle signal at a predetermined timing. The ITP (interpolation) signal output is usually made at intervals of 8 milliseconds. The CPUs 11 and 21 manage an interpolation processing time in response to the interpolation cycle signal.

The CPU 11 is connected to the CPU 21 through a bus, and data is exchanged therebetween through the bus.

In the prior art axis control system, since the ITP (interpolation) cycle signal serving as an interpolation criterion is created by the respective different interpolation signal generation circuits 17 and 27, the CPUs 11 and 21 generate the interpolation cycle signal at a different timing. As a result, a problem arises in that the CPU 11 can control the axis X1, the axis Y1, the Z-axis, and the C-axis, but cannot control the axis X2 and the axis Y2, whereas the CPU 21 can control the axis X2 and the axis Y2, but cannot control the axis X1, the axis Y1, the Z-axis, and the C-axis.

DISCLOSURE OF THE INVENTION

Taking the above into consideration, an object of the present invention is to provide an axis control system for a numerical control apparatus, by which a plurality of microprocessors for interpolating axes that each have a different axis arrangement can arbitrarily select axes to be interpolated, respectively.

To solve the above problem, according to the present invention, there is provided an axis control system for a numerical control apparatus having first and second microprocessors for interpolating axes that each have a different axis arrangement and first and second interpolation signal generation circuits provided with each of the microprocessors for generating an interpolation cycle signal, which comprises the second interpolation signal generation circuit receiving an output signal from the first microprocessor and the interpolation cycle signal from the first interpolation signal generation circuit and generating an interpolation cycle signal synchronized with the first interpolation signal generation circuit based on a logic of the received signals.

The second interpolation signal generation circuit receives the output signal from the first microprocessor and the interpolation cycle signal from the first interpolation signal generation circuit. The second interpolation signal generation circuit does not generate an interpolation cycle signal until receiving the interpolation cycle signal from the first interpolation signal generation circuit after it has received the output signal from the first microprocessor. Then, upon reception of the interpolation cycle signal from the first interpolation signal generation circuit, the second interpolation signal generation circuit generates the interpolation cycle signal. With this arrangement, the first and second interpolation signal generation circuits generate a synchronized interpolation cycle signal, and when the interpolation cycle signal is synchronized, the first and second microprocessors can interpolate the axes that each have a different axis arrangement.

BRIEF DESCRIPTION OF THE DRAWINGS

FIGS. 3(a) and 3(b) are diagrams showing a timing of the operation of the interpolation signal generation circuit; and FIG. 4 is a diagram showing a prior art axis control system for a numerical control apparatus.

BEST MODE OF CARRYING OUT THE INVENTION

An embodiment of the present invention will be described below with reference to the drawings.

Figure 1:
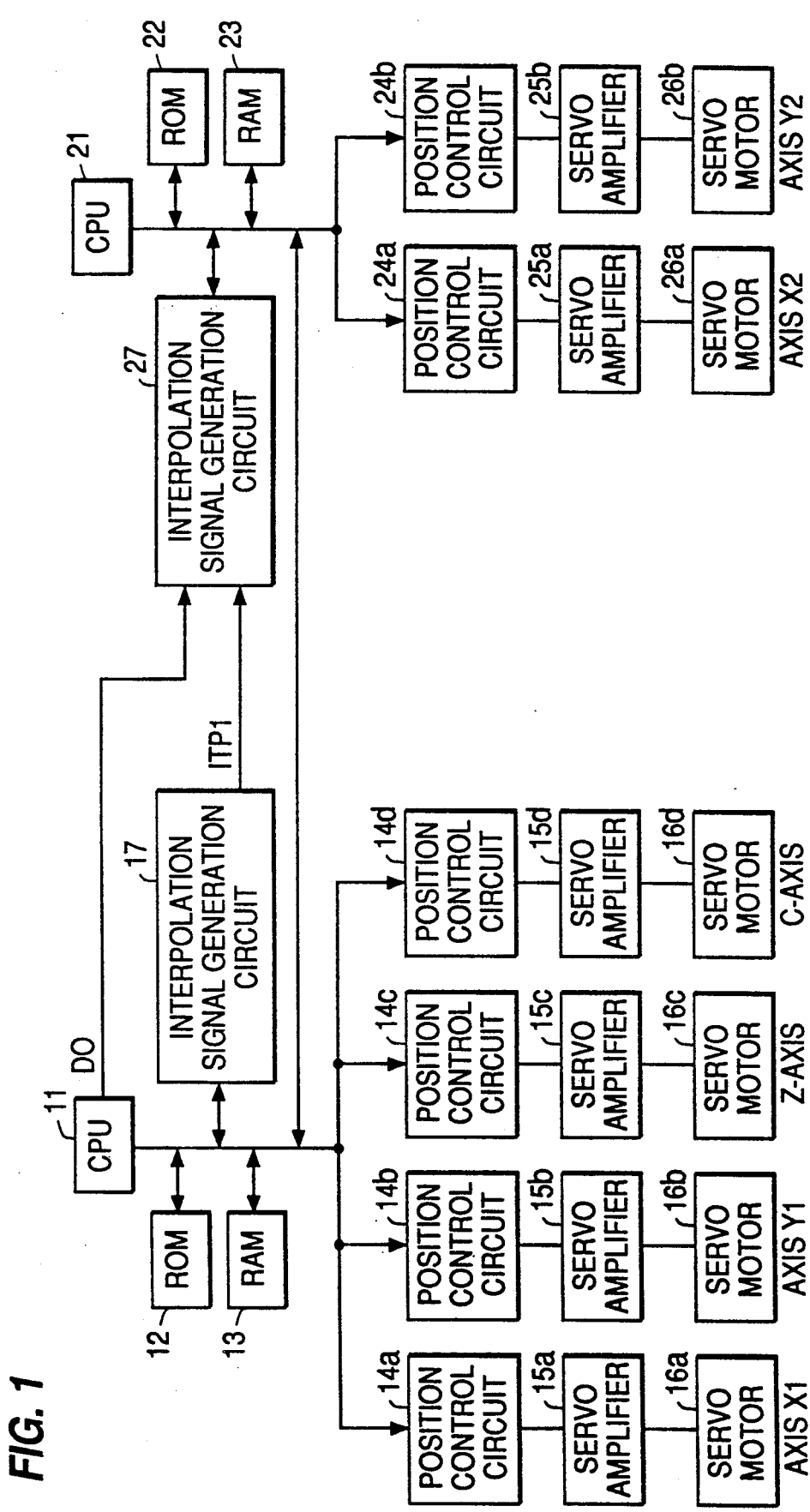
FIG. 1 is a diagram showing a schematic arrangement of an embodiment of an axis control system for a numerical control apparatus according to the present invention.

FIG. 1 is a diagram showing a schematic arrangement of an embodiment of an axis control system for a numerical control apparatus according to the present invention. Since the same numerals as used in FIG. 4 are used to designate the same elements, a description thereof is omitted.

In the present embodiment, an output signal DO from a CPU 11 and an interpolation cycle signal ITP1 from an interpolation signal generation circuit 17 are output to an interpolation signal generation circuit 27. The interpolation signal generation circuit 27 receives these signals DO and ITP1 and creates an ITP (interpolation) cycle signal ITP2 synchronized with the interpolation signal generation circuit 17.

Figure 2:
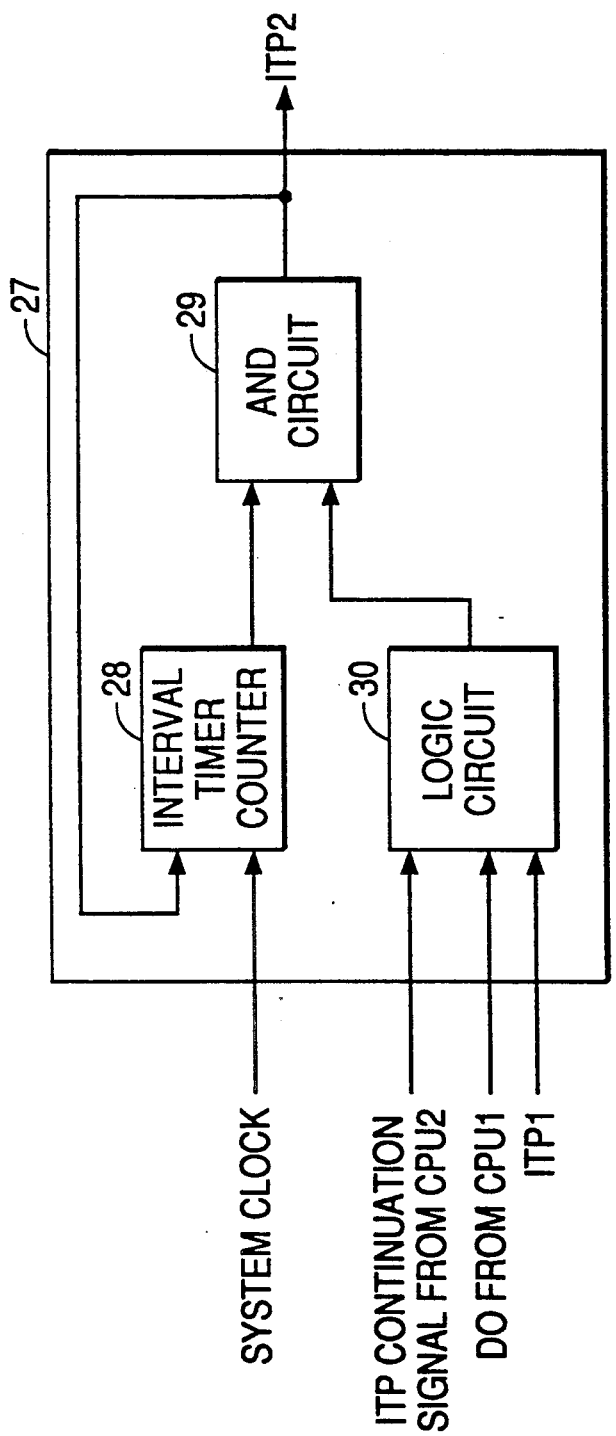
FIG. 2 is a diagram showing the detailed arrangement of an interpolation signal generation circuit.

FIG. 2 is a detailed diagram of arrangement of the interpolation signal generation circuit 27.

An interval timer counter 28 receives a system clock of 1 microsecond and outputs an interpolation cycle signal to an AND circuit 29 at every 8000 counts. When an output from a logic circuit 30 is at a high level "1", the AND circuit 29 outputs the interpolation cycle signal ITP2 from the interval timer counter 28. The interval timer counter 28 is reset in response to the interpolation cycle signal ITP2 from the AND circuit 29.

The logic circuit 30 receives an ITP continuation signal from a CPU 21, the output signal DO from the CPU 11, and the interpolation cycle signal ITP1 from the interpolation signal generation circuit 17, and outputs the logical result thereof to the AND circuit 29.

The ITP continuation signal is defined as a signal to be output when the interpolation cycle signal ITP2 received by the CPU2 has been interpolated. Therefore, if the ITP continuation signal is not at a high level "1", the high level "1" cannot be output to the AND circuit 29.

Further, the logic circuit 30 sets the output therefrom to a low level "0" by receiving the output signal DO from the CPU1, and the logic circuit 30 set to the low level "0" in response to the output signal DO from the CPU1 is reset by receiving the interpolation cycle signal ITP1 from the CPU1 and outputs a high level "1" to the AND circuit 29. Therefore, when the output signal DO from the CPU1 is input to the logic circuit 30, the AND circuit 29 cannot output the interpolation cycle signal ITP2 even if the interval timer counter 28 outputs a high level "1". The AND circuit 29 outputs the interpolation cycle signal ITP2 as soon as the interpolation cycle signal ITP1 is input to the logic circuit 30.

The operation of the interpolation signal generation circuit 27 will be described below with reference to the drawings. FIGS. 3(a) and 3(b) show a timing of the operation of the interpolation signal generation circuit 27.

In FIG. 3(a), although the interpolation cycle signal ITP1 from the interpolation signal generation circuit 17 and the interpolation cycle signal ITP2 from the interpolation signal generation circuit 27 are output at a cycle of 8 milliseconds, but these signals are generated at a different timing. When the output signal DO from the CPU1 is input to the logic circuit 30, the logic circuit 30 outputs a low level "0", regardless of the ITP continuation signal from the CPU2, until the interpolation cycle signal ITP1 is input, and as soon as the interpolation cycle signal ITP1 is output, the interpolation cycle signal ITP2 synchronized with the interpolation cycle signal ITP1 is output.

In FIG. 3(b), the interpolation cycle signals ITP1 and ITP2 are synchronized with each other and output at the same timing. At this time, even if the same time is needed for the CPU 2 to effect the interpolation, accordingly and an output of the ITP continuation signal from the CPU1 is delayed, the interpolation signal generation circuit 27 outputs an interpolation cycle signal ITP2 which is a shifted synchronization with the interpolation cycle signal ITP1. More specifically, the synchronization of the interpolation signals can be shifted to match a shift in the synchronization caused by the interpolation processing time. Note, even if the synchronization is shifted as described above, the interpolation cycle signals ITP1 and ITP2 can be resynchronized by an operation similar to that of FIG. 3(a).

As described above, according to the present invention, even if the interpolation signal generation circuits generate signals at a different timing, the signals can be easily synchronized, and even if the timing of the signals is shifted by the state of an interpolation processing after the synchronization has been achieved, the interpolation processing can be carried out in the state where the synchronization of the signals has been shifted.

In the above embodiment, the case in which the interpolation signal generation circuit 27 is synchronized is described, but the interpolation signal generation circuit 17 may be synchronized or both interpolation signal generation circuits may have the same arrangement and any one of the interpolation signal generation circuits may be synchronized.

As described above, according to the present invention, interpolations signals from interpolation signal generation circuits provided with each microprocessors can be synchronized, and thus a plurality of the microprocessors for interpolating axes that each have a different axis arrangement can arbitrarily select the axes to be interpolated, respectively.

We claim:

1. An axis control system for a numerical control apparatus having first and second microprocessors for interpolating axes having a different axis arrangement from each other and first and second interpolation signal generation circuits provided with each of said microprocessors for generating an interpolation cycle signal, characterized in that:

said second interpolation signal generation circuit receiving an output signal from said first microprocessor and a first interpolation cycle signal from said first interpolation signal generation circuit and generating a second interpolation cycle signal synchronized with said first interpolation signal based on a result of logical operation of said output signal and said first interpolation cycle signal.

* * * * *